(No Model.)
R. M. HUNTER.
ELECTRIC RAILWAY.
No. 551,587. Patented Dec. 17, 1895.
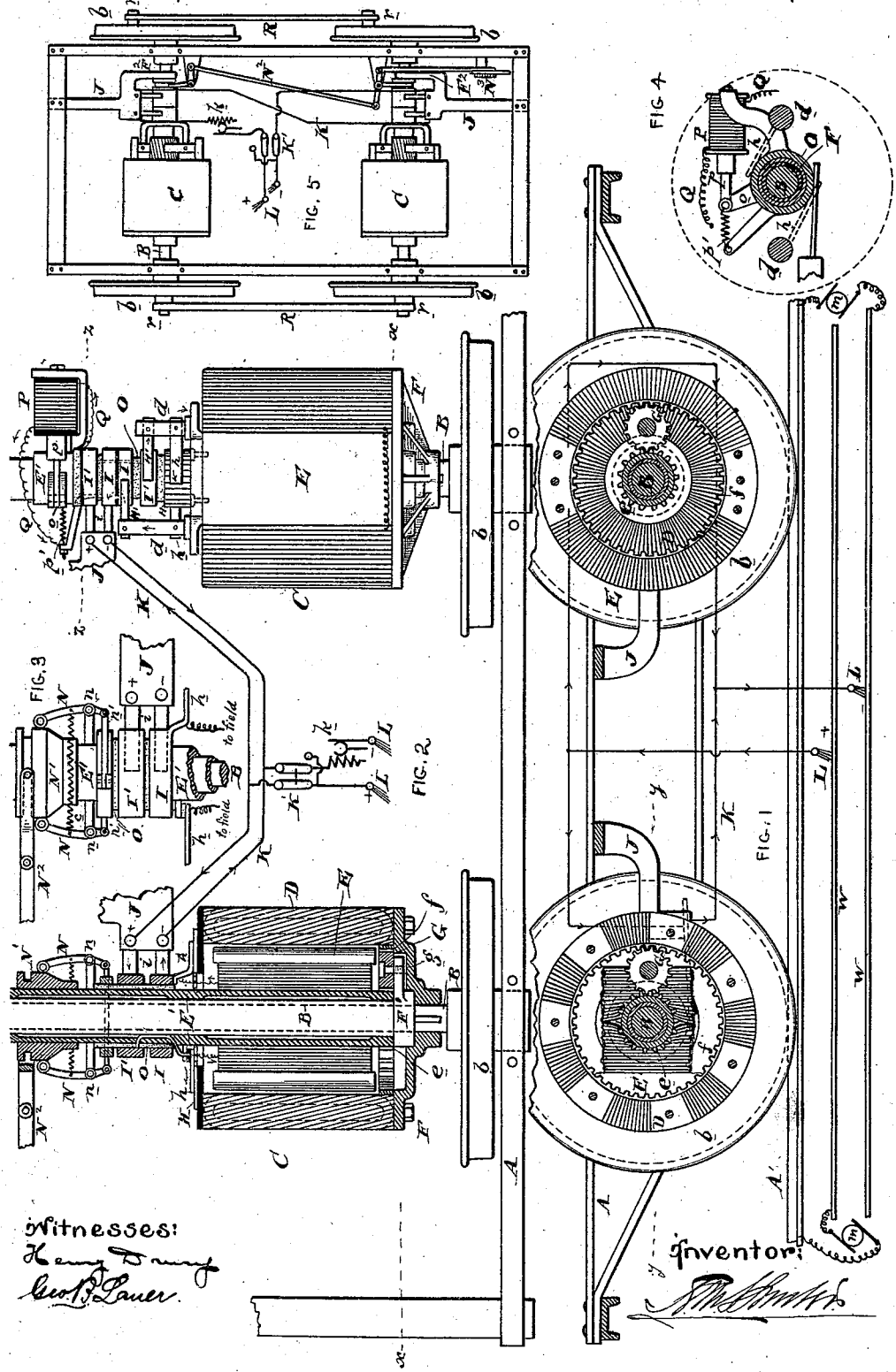
Witnesses:
Henry Drury
Geo. P. Lauer
Inventor:
R. M. Hunter

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 551,587, dated December 17, 1895.

Application filed February 23, 1887. Serial No. 228,533. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric cars; and it consists in certain improvements, all of which are fully set forth in the following specification and shown in the accompanying drawings, which form a part thereof.

In the drawings, Figure 1 is a longitudinal sectional elevation through the electric truck of car embodying my improvements on line $x$ $x$ of Fig. 2. Fig. 2 is a plan view of part of same with one of the motors in section on line $y$ $y$ of Fig. 1. Fig. 3 is a plan view of the reversing device for the motor, shown in section in Fig. 2. Fig. 4 is a sectional elevation on line $z$ $z$ of Fig. 2, showing one form of electrical apparatus for reversing the motor or changing the lead of the commutator with reference to the brushes; and Fig. 5 is a plan view of my improved electrically-propelled vehicle, showing certain modifications from that shown in Figs. 1 and 2.

A is the truck-frame, or, if desired, may be considered as the car-frame.

B are the two axles having the wheels $b$ secured thereon and journaled in suitable boxes held by the frame A.

As shown in Fig. 2, the frame A and its boxes are upon the outside of the wheel-base, while in Fig. 5 it is shown as inside of the wheel-base and between the wheels and the motors C. In this latter case the wheels or their axles may have cranks $r$ connected by bars R. The object of this is to equalize the traction power on all of the wheels, each motor operating to rotate all four wheels, whether assisted by the other or not.

C C are the two motors, one upon each axle, and supported wholly thereby and without weight-supporting connections with the frame A. Referring to Figs. 1 and 2, two types of electric motors are shown, the one on the right end of the truck having a revolving armature D loosely supported by a sleeve carried upon the axle B, and revolving field-magnets E firmly secured to the axle B, while the electric motor at the left end of the truck has the revolving field-magnets loosely supported by a sleeve carried upon the axle and the revolving armature firmly secured to the axle. That portion secured to the axle is provided with a gear $f$, which is geared to the pinion $e$ secured to a part loosely supported upon the axle through the mediation of a spur-wheel G which is carried by a pin or stud $g$ secured to a head F', and thereby connects the axle with the armature or field-magnets as the case may be. The head to which the spur-wheel G is secured is sleeved upon the axle and held against rotation by a connection at $F^2$. From this it will be seen that the field-magnets and armature move in opposite directions and their speeds are commensurate with each other and proportional to the gear-wheel $f$ and pinion $e$. Both parts are wholly supported by the axle and independent of the frame A or the car-wheels.

Referring to the commutator devices of the left-hand motor we have the commutator H, secured to and revolving with the armature D. The brushes $h$ are connected to the sleeve O, which is provided with two annular rings I and I', connected, respectively, with the two brushes $h$. The sleeve O is carried by the tubular shaft E', to which the field-magnets are secured, and is adapted to have a slight rotary motion thereon sufficient to change the lead of the brushes $h$ to reverse the motor. Current is fed from the motor-circuit K to the respective rings I and I' by means of conductors $i$ pressing in contact with the said rings and carried by a frame J, secured to the car body or truck. To obtain the change in lead to reverse the motor or vary the angular advance of the brushes to prevent sparking with change of speed I provide the following device: The sleeve O, carrying the brushes, is connected by links $n'$ with levers N, pivoted to the tubular shaft E' at $n$ and drawn together by springs $c$. The free ends of these levers N rest upon a cone-shaped cylinder N', which may be shifted longitudinally upon the shaft E' by the reversing-lever $N^2$. By longitudinally shifting the part N' the lead of the brushes will be changed sufficiently to reverse the motor, and the angular advance to prevent sparking may be controlled by the same means.

Referring now to the commutator devices shown on the motor at the right-hand end of Fig. 2 and also in Fig. 4, we have the commutator H, connected with the revolving armature in the ordinary way. The brushes h are connected with the revolving field-magnets and are held in arms d, carried thereby. The commutator H and current-supplying rings I I' are secured to a sleeve O, and a connection is made between the respective commutator-brushes and the rings I I' by the brushes H', also held by the arms d and pressing in contact with the respective rings. Current is fed to the rings by contacts i, as in the case before referred to. In both constructions it will be observed that the field-magnets are in shunt relation with the armature. To produce the lead necessary to reverse the motor I provide an electro-helix P, secured to the sleeve O and provided with a polarized armature p, connected to an arm o, secured to the tubular shaft E', to which the revolving armature is secured. A spring p' may be used to draw the core out of the helix. The helix is in a shunt-circuit Q, connecting with the respective rings I I'. From this it will be observed that when the current passes in one direction, the armature p will be drawn in and give the proper lead for rotating in one direction. If the current is reversed, the core is thrust out of the helix, giving the necessary lead in the opposite direction. The current may be reversed by the reversing-switch K' in the motor-circuit, and the resistance may be varied by the resistance-changer k to control the amount of current passing to the motor or motors. The reversing-switch K' in the construction shown is of no special use except where the motor should run on circuits in which the collectors receive currents of the opposite polarity to what they had been receiving.

In the construction shown in Fig. 5 for changing the lead, the commutator is made with oblique sections, and the brushes are made to shift over them substantially as is set out in my Patent No. 347,937, of August 24, 1886. In this figure both reversing devices are operated by the same connections N² and hand-lever N³, and both motors are connected in series, whereas in Figs. 1 and 2 the motors are shown as connected in multiple arc.

By the construction of motor and connection herein set out we may have a high relative speed between the coils of the armature and field with a relatively slow speed to that part which is secured to the axle. This has the effect of directly rotating the axle without intermediate gear, and for a normal speed of rotation of the axle the generation of a high counter-electromotive force. This improves the efficiency and reduces the heating tendency of the motor. To do this by the construction set out, the commutator and brushes must be common both to the field-magnets and armature, and both the commutator-segments and the brushes be made to rotate, but in opposite directions and with speeds equal to those of the parts to which they are respectively secured.

Having now described my invention, what I claim as new, and desire to secure by Letters Patent, is—

1. In an electric railway, an electrically propelled vehicle, combined with an electric motor made substantially cylindrical and supported directly by the axle independent of and between the wheels, and a commutator and brushes for the field magnets and armature.

2. In an electric railway, an electrically propelled vehicle, combined with an electric motor supported directly by the axle and having rotating field magnets and armature and provided with a commutator and brushes for the field magnets and armature.

3. In an electric railway, an electrically propelled vehicle combined with an electric motor supported directly by the axle and having rotating field magnets and armature adapted to rotate in opposite directions and provided with a commutator and brushes for the field magnets and armature.

4. The combination of the axles and wheels, a vehicle frame supported upon the axles, and an electric motor having its weight supported by the axle independently of the vehicle frame and provided with a rotating part arranged to rotate the axle.

5. The combination of axles and wheels of an electrically propelled vehicle, an electric motor having its weight wholly supported by and connected to rotate the axles, and a vehicle frame supported upon the axles independently of the motor.

6. The combination of a vehicle axle and its wheels, and an electric motor supported by and having its weight supported wholly by said axle intermediate of the wheels and having its field magnets and armature both adapted to rotate in opposite directions through the mediation of gearing.

7. The combination of a vehicle axle, an electric motor having its field magnets and armature both supported thereon, the armature of which is secured to the axle and the field magnets free to rotate, and gearing between the armature and field magnets.

8. The combination of a vehicle axle, an electric motor having its field magnets and armature supported thereon, the armature of which is secured to the axle and the field magnets free to rotate, and gearing between the armature and field magnets to cause them to rotate in opposite directions and at different speeds.

9. The combination of a vehicle axle, an electric motor having rotating field magnets and armature, a commutator to control the current in the armature, and brushes for said commutator secured to and revolving with the field magnets.

10. The combination of a vehicle axle, an electric motor having rotating field magnets and armature, a commutator to control the current in the armature, brushes for said commutator secured to and revolving with the field magnets, positive and negative current supplying rings in electrical connections with said commutator brushes, and stationary current supplying brushes in contact with said rings.

11. The combination of a vehicle axle, an electric motor having rotating field magnets and armature, a commutator to control the current in the armature, brushes for said commutator secured to and revolving with the field magnets, and means to change the lead between the commutator and its brushes.

12. The combination of a vehicle axle, an electric motor having rotating field magnets and armature, a commutator to control the current in the armature, brushes for said commutator secured to and revolving with the field magnets, and an electrical device under the control of the operator to change the lead between the commutator and its brushes.

13. The combination of a vehicle axle, an electric motor having rotating field magnets and armature, a commutator to control the current in the armature, brushes for said commutator secured to and revolving with the field magnets, positive and negative current supplying rings in electrical connection with said commutator brushes, stationary current supplying brushes in contact with said rings, and means to change the lead between the commutator and its brushes.

14. The combination of a vehicle axle, an electric motor having rotating field magnets and armature, a commutator to control the current in the armature, brushes for said commutator secured to and revolving with the field magnets, positive and negative current supplying rings in electrical connection with said commutator brushes, stationary current supplying brushes in contact with said rings, a source of electric supply, a motor circuit, and a reversing switch in said circuit.

15. The combination of the wheels and axles, a truck frame supported upon the axles, and an electric motor having its weight supported directly by the axle within and independent of said frame but having a connection therewith.

16. The combination of the wheels and axles, a truck frame supported upon the axles, an electric motor supported directly by the axle within the frame and independent of said frame, and current supply brushes to supply current to the motor, said brushes being secured to and carried by said frame.

17. The combination of the wheels and axles, a truck frame supported upon the axles, an electric motor having rotating field magnets and rotating armatures supported directly by the axle within the frame and having their weight supported by the axles independent of said frame, and in which one of the rotating parts is secured to the axle.

18. The combination of the wheels and axles, a truck frame supported upon the axles, an electric motor having rotating field magnets and armature supported directly by the axle within the frame and independent of said frame, and in which one of the rotating parts is secured to the axle, a rotating commutator carried by the armature, traveling brushes carried by the field magnets, and means to change the lead of the brushes to reverse the motor.

19. In an electric car, the combination of the two axles and their wheels, a car frame for the superstructure supported by the axles, and two independent motors supported by the axles independently of said car frame and respectively connected to rotate the axles.

20. In an electric car, the combination of the two axles and their wheels, a car frame for the superstructure supported by the axles, two independent motors having their weight supported by the axles independently of said car frame and respectively connected to rotate the axles, and a motor circuit common to both of said motors.

21. In an electric car, the combination of the two axles and their wheels, a car frame for the superstructure supported by the axles, two independent motors having their weight supported by the axles independently of said car frame and respectively connected to rotate the axles, a motor circuit common to both of said motors, and a resistance changer in said motor circuit.

22. In an electric car, the combination of the two axles and their wheels, a car frame for the superstructure supported by the axles, two independent motors having their weight supported by the axles independently of said car frame and respectively connected to rotate the axles, a motor circuit common to both of said motors, and a current regulator in said circuit to control both motors simultaneously.

23. The combination of the two axles and their wheels, the truck frame connecting them, two independent motors arranged concentrically upon and connecting with said axles respectively and each having rotating armatures and rotating field magnets, a motor circuit common to both of said motors, and a resistance changer in said circuit.

24. The combination of the two axles and their wheels, the truck frame connecting them, two independent motors connecting with and concentrically arranged upon said axles respectively and having their weight directly sustained thereby, and a motor circuit common to both of said motors and connecting them in series.

25. The combination of the two axles and their wheels, the truck frame connecting them, two independent motors directly supported upon and connecting with said axles between the wheels thereof respectively, and a mechanical power transmitting device between the two axles on the outside of the wheels to insure them both rotating at the same speed.

26. The combination of the two axles and their wheels, a truck frame connecting said axles and two motors directly supported upon and connecting with the two axles respectively between the wheels thereof, cranks secured to or formed on the wheels or their axles outside of the wheels, and connecting bars between the two cranks on each side of the vehicle.

27. The combination of the two axles and their wheels, a truck frame connecting said axles and located between the wheels, two motors connecting with the two axles respectively and supported thereby independently of the truck frame, cranks secured to or formed on the wheels or their axles, and connecting bars between the two cranks on each side of the vehicle.

28. The combination of the two axles and their wheels, the truck frame connecting them, two independent motors connecting with said axles respectively and having their weight supported wholly by said axles and independently of the truck frame.

29. The combination of the two axles and their wheels, a truck frame connecting them, two independent motors connecting with said axles respectively, and means to change the lead of the brushes of both motors simultaneously.

30. In an electrically propelled vehicle, the combination of the axles and wheels, a vehicle frame supported upon the axles by boxes, an electric motor arranged concentric with and secured to one of the axles to rotate it, and mechanical power transmitting connections between both axles, whereby the impulse imparted to one axle is transmitted to the other axle.

31. In an electrically propelled vehicle, the combination of the axles and wheels, a truck frame, an electric motor having its weight wholly sustained by the axle to which it is mechanically secured to rotate it, and a connection between one part of the motor and truck frame to prevent rotation thereof while another part of the motor rotates with the axle.

32. In an electrically propelled vehicle, the combination of the wheels, axles and frame of the vehicle, with two electric motors arranged respectively adjacent to and adapted to rotate the two axles and having their field magnets and armatures supported by the axles and with the armatures and field magnets of each motor controlled as a unit at a single or central place on the vehicle with conductors leading to a source of electrical energy.

33. In an electrically propelled vehicle, the combination of the wheels, axles and frame of the vehicle, an electric motor arranged adjacent to and adapted to rotate each of two axles, motor circuits extending from the two motors and connected at a central place on the vehicle with conductors leading to a source of electrical energy whereby the motors are coupled in parallel, and a regulator arranged upon the vehicle common to both motors for simultaneously controlling the current in the two motors.

34. In an electrically propelled vehicle, the combination of the wheels, axles and frame of the vehicle, an electric motor arranged adjacent to and adapted to rotate each of two axles, motor circuits extending from the two motors and connected at a central place on the vehicle with conductors leading to a source of electrical energy whereby the motors are coupled in parallel, and a resistance changer on the vehicle in the conductor leading to the source of electrical energy.

35. In an electrically propelled vehicle, the combination of the vehicle structure, two electric motors one arranged adjacent to and adapted to rotate each of the two axles, a current collecting device carried by the vehicle, and a motor circuit leading from the current collecting device to each motor whereby they are coupled in parallel.

36. In an electrically propelled vehicle, the combination of the vehicle structure, an electric motor arranged adjacent to and adapted to rotate each of two axles, a current collecting device carried by the vehicle, a motor circuit leading from the current collecting device to each motor whereby they are coupled in parallel, and a regulator on the vehicle in the motor circuit between the collector and motors for controlling the current delivered to the motors.

37. In an electrically propelled vehicle, the combination of the vehicle structure, an electric motor arranged adjacent to and adapted to rotate each of two axles, a current collecting device carried by the vehicle, a motor circuit leading from the current collecting device to each motor whereby they are coupled in parallel, and a resistance changer on the vehicle in the motor circuit between the collector and motors for controlling the current delivered to the motors.

38. In an electrically propelled vehicle, the construction of the vehicle structure, an electric motor arranged adjacent to and adapted to rotate each of two axles, electric circuits connecting the motors in the same circuit, motor circuits on the vehicle connecting with the electric circuits of the motors at an intermediate point, and a current controlling device arranged in the motor circuit for controlling the speed of the motors.

In testimony of which invention I hereunto set my hand.

RUDOLPH M. HUNTER.

Witnesses:
RICHD. S. CHILD,
E. M. BRECKINREED.